(No Model.)

A. S. HARRELL.
COTTON CHOPPER AND CULTIVATOR.

No. 438,153. Patented Oct. 14, 1890.

Witnesses.
A. Ruppert,
T. L. Wade

Inventor:
Alexander S. Harrell,
Per
Thomas P. Simpson,
Atty.

UNITED STATES PATENT OFFICE.

ALEXANDER S. HARRELL, OF MINDEN, LOUISIANA.

COTTON CHOPPER AND CULTIVATOR.

SPECIFICATION forming part of Letters Patent No. 438,153, dated October 14, 1890.

Application filed March 29, 1890. Serial No. 345,808. (No model.)

*To all whom it may concern:*

Be it known that I, ALEXANDER S. HARRELL, a citizen of the United States, residing at Minden, in the parish of Webster and State of Louisiana, have invented certain new and useful Improvements in Cotton Choppers and Cultivators; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to improve combined cotton choppers and cultivators, as hereinafter described, and pointed out in the claim.

Figure 1:
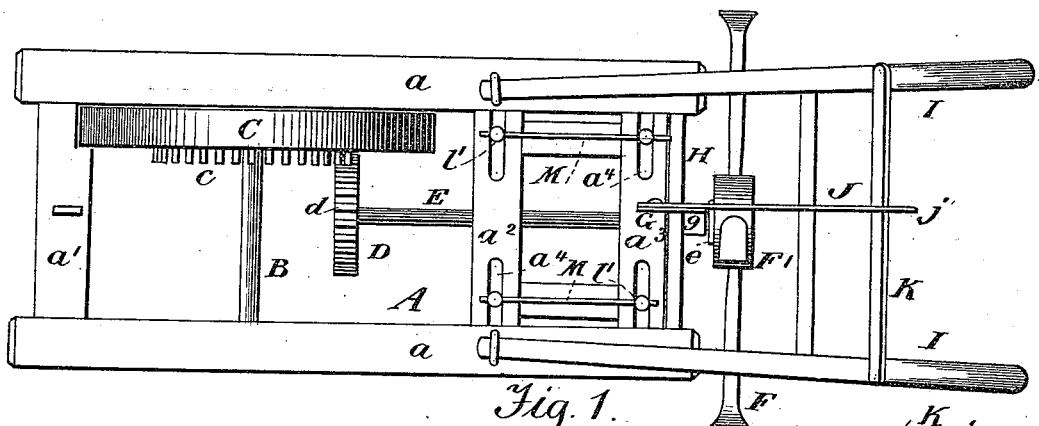
Figure 2:
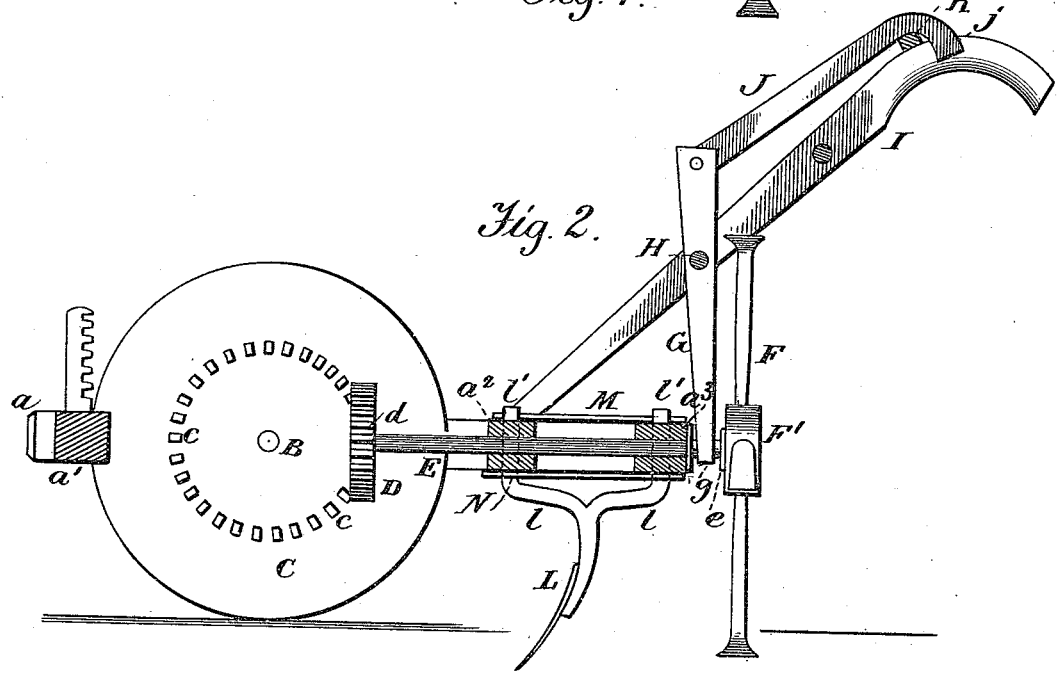
Figure 3:
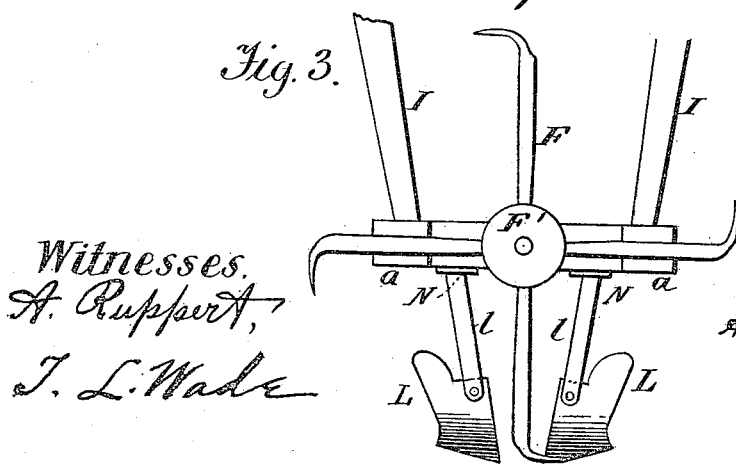

Figure 1 of the drawings is a plan view; Fig. 2, a longitudinal vertical section; Fig. 3, a rear elevation.

In the drawings, A represents a rectangular frame consisting of two bars $a$ $a$, which form the sides, and three cross-bars $a'$ $a^2$ $a^3$.

B is is a cross-pivot, on which turns the ground-wheel C, having on one side a concentric circle of studs or spurs $c$, which mesh with the spurs of a pinion D at right angles thereto on a longitudinal shaft E, which is journaled in the cross-bars $a^3$ $a^2$ and carries on its rear end the radial choppers F in a hub F'. The shaft E is provided with the two collars $e$ $e$ near its rear end, and between them carries or receives the hook $g$ on the lower end of a vertical lever G, which is fulcrumed on a round spacer-rod H between the handles I I.

To the upper end of the lever H is pivoted one end of a bar or rod J, which has a hook $j$ on the other end to engage a cross-rod K, fastened to the handles. The shaft E is loose, and is made to slide back and forth in its bearings, so as to connect or disconnect the spurs $c$ $d$. When the hook-rod J is engaged with the rod K, the spurs $c$ $d$ mesh together and the ground-wheel rotates the choppers as it turns on the ground, thus cutting out the superfluous plants, while the plows L L run on each side of the row.

I make the plows L L with two opposite arms $l$ $l$, whose free ends pass up through slots $a^4$ in the cross-bars $a'$ $a^2$ and receive through transverse holes the rods M, which hold the plows securely in position at a greater or less distance apart, the shanks $l'$ being adjusted in the slots before the rods M are put in place. I may use a washer N on the arms $l$ $l$, but it is not absolutely necessary.

The choppers are set in cast-iron hubs, may be raised or lowered therein to regulate the depth of cut, and may be held by set-screws. I usually keep three sets of hubs containing, respectively, four, three, and two hoes or choppers, which are seven and one-half, ten, and fourteen inches wide.

I may use nuts on the upper ends of the plow-arms $l$ instead of wires or rods passing through eyes or holes therein.

Having thus described all that is necessary to a full understanding of my invention, what I claim as new, and desire to protect by Letters Patent, is—

In a cotton chopper and cultivator, the plow-standards having arms $l$ $l'$ and the chopper-shaft, in combination with two cross-bars $a^2$ $a^3$, vertically slotted to receive the shanks of the standards and provided with horizontal bearings for the chopper-shaft, as shown, and for the purposes described.

In testimony whereof I affix my signature in presence of two witnesses.

ALEXANDER S. HARRELL.

Witnesses:
H. M. CARTER,
J. H. CHAUB.